May 21, 1957  G. BERGSON  2,793,094
INDEXING AND HOMING MECHANISM
Filed May 3, 1954  2 Sheets-Sheet 1

ALL RELAY CONTACTS SHOWN
IN THE NORMAL POSITION WHEN
THE MOTOR 30 IS DEENERGIZED

INVENTOR.
GUSTAV BERGSON
BY Eugene M. Whitacre
ATTORNEY

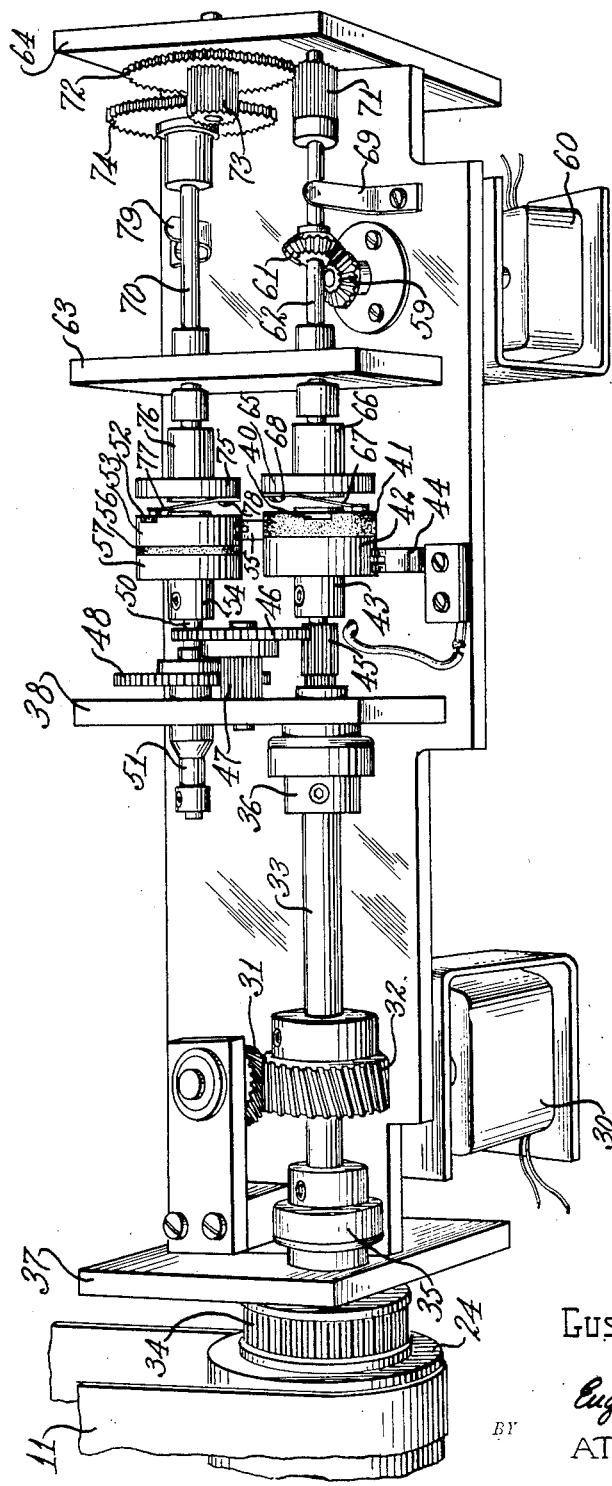

20 # United States Patent Office 2,793,094
Patented May 21, 1957

2,793,094

INDEXING AND HOMING MECHANISM

Gustav Bergson, Philadelphia, Pa.

Application May 3, 1954, Serial No. 427,309

8 Claims. (Cl. 346—62)

This invention relates to indexing mechanisms. More particularly, the invention relates to precision advancing mechanisms for use with multi-point recording systems and the like.

In modern complex industrial operations, it is frequently necessary that large numbers of measurements of temperature, pressure, voltage, amperage and the like, be made to accurately and properly control a particular operation. It is often desirable to provide a central control location for a plurality of indicating devices so that a continuous and immediate check can be conveniently kept on the various measurements at all the points of interest. Furthermore, it is often desirable to provide at a central control location a single instrument for permanently recording the readings of a plurality of different measuring instruments.

One form of instrument for recording a plurality of such measurements which will be referred to as a multi-point recorder, includes a recording element hereinafter called a printer which may, for example, be a pen or stylus, or any suitable means for recording on a recording medium. The printer is successively connected with each of the various measuring instruments and is adapted to be responsive thereto for producing an appropriate recording on a recording medium. The recording medium may comprise, by way of example, an elongated sheet of recording paper in the form of an endless belt having separate graph portions successively positioned along the length of the paper. Each of the graph portions is scaled to have a time axis along the length of the paper and a lateral axis corresponding to the measurement to be recorded in that particular graph portion. Each of the successive graph portions along the length of the paper contain readings from only one of the measuring devices.

The recording paper is placed on appropriate driving rollers in the multi-point recorder and is positioned so that the printer is adjacent the proper portion of the time axis on the graph of the first measurement to be recorded. The printing device is movable along a lateral axis with respect to the recording papers in accordance with the magnitude of the first measurement and an appropriate mechanism causes the printer to mark the paper. Hence, a mark is placed on the recording paper indicating the reading or value of the first measurement at that particular time.

After the printing operation has taken place, an indexing mechanism advances the recording paper until the printer is in position to mark adjacent the proper portion of the longitudinal time axis on the next successive graph portion along the length of the paper. The printer in the meantime is disconnected from the first measuring device and is connected for control by a second measuring device. The printing device moves in a lateral direction with respect to the paper in accordance with the magnitude of the second measurement and the printer mechanism causes this reading to be recorded. After this printing takes place, the indexing mechanism again advances the recording paper until the printing mechanism is in the proper position to mark the paper in accordance with the reading of the third measuring device on the third successive graph portion along the length of the graph paper. This process continues until the first graph portion is again moved under the printer.

In order to provide a continuous reading along the time axis of each of the graph portions, the recording paper is advanced in such a manner that each successive printing on a particular graph portion is a small distance farther along the time axis of that graph portion so that the indications will not be printed directly on top of each other. If the paper is advanced in this manner, an intermittent recording of the respective quantities measured is attained which may appear to be a substantially continuous graph.

In prior systems the recording paper indexing mechanism of multi-point recorders was found to be difficult to adjust so that the recording paper would be properly advanced in the manner above described. As can be readily seen, a slight error in each advancement of the recording paper is a progressive error which easily attains sizable proportions in moving the recording paper and the printer out of synchronization. Hence, it was necessary that a skilled operator be provided to insure that the multi-point recorders were at all times properly adjusted.

It is frequently desirable to be able to view at a single viewing all the graphs on the recording paper. Since the recording paper is in the form of an endless belt, some of the graphs will be on the back side, and the recording paper must be moved in order to bring recordings on the back side thereof in a position for viewing by the operator. In prior systems, such an operation almost invariably put the indexing mechanism out of synchronization with the recording paper, hence requiring adjustment of the indexing mechanism or of the paper, or both.

It is an object of this invention to provide an improved advancing mechanism for a multi-point recording system, or the like, which provides accurate and positive indexing of the recording paper to maintain the recording paper and the printer in constant synchronization with a minimum amount of attention and adjustment.

It is a further object of this invention to provide an improved intermittent indexing mechanism for the recording medium of a multi-point recorder of the type which records on different graph portions disposed successively along the recording medium the measurements of different quantities to be recorded, and to further provide means for selectively energizing said mechanism to move the recording medium any predetermined amount, and to thereafter accurately index the recording medium without further manual adjustment whereby the recordings on the graph paper are accurate continuations of the previous recordings.

In accordance with the invention, the indexing mechanism comprises a first driving motor which simultaneously rotates the recording medium and a first contact member. A second contact member which is positioned for intermittent cooperative engagement with said first contact member is rotated by a second driving motor which may be, for example, a twenty-four hour motor, that is a motor which makes one revolution in twenty-four hours. Appropriate circuit means are connected with the printer mechanism to energize the first driving motor and an electric circuit is connected with the contacts and with the field windings of the first driving motor whereby when the first and second contacts are in engagement, the motor is immediately stopped, hence stopping the recording paper. If the recording paper is initially properly indexed, each successive time a particular graph on the recording paper is moved under the printer, the paper will be advanced slightly due to the relative movement of the first and second contacts, thus keeping the recording paper in synchronization with the printer.

Mechanism is provided so that an operator may have the recording paper move independently of the indexing mechanism so that the different graph portions may be brought into a position for viewing. This mechanism, which will be referred to as a homing mechanism, includes a third contact member which is driven by the first driving motor through a speed reducing gear train or the like. A fourth contact member is positioned for cooperative intermittent engagement with the third contact member and is driven by the second driving motor through a second speed reducing gear train having substantially the same ratio of speed reduction as has the first gear train.

A manually depressed switch initially energizes the first driving motor in the homing operation and an electric circuit is provided in connection with the third and fourth contacts for causing the motor to remain energized for a predetermined larger time than for an ordinary indexing movement. This circuit in effect, renders the circuit including the first and second contacts inoperative, and the recording paper is moved until the third and fourth contacts are moved into engagement by their respective driving means whereupon the first driving motor is stopped.

In order that the recording paper make a complete revolution so that all the graphs may be viewed the reduction of speed of the third and fourth contact members with respect to the first and second contact members respectively, should be proportional to the number of graphs positioned successively along the recording paper. For example, if fifteen graphs are positioned successively along the recording paper, the speed reducing ratio would be fifteen to one. In this manner, the recording paper will be homed each time to a particular one of the graphs on the recording paper, enabling the operator in the meantime to view all the other graphs as they pass under the printing device. Upon reaching the predetermined home graph the mechanism stops the recording paper precisely at the exact point where the next printing should take place thus eliminating any necessity for readjustment of the paper or of the mechanism.

Accordingly a still further object of this invention is to provide an indexing mechanism and homing mechanism of the type described, which is characterized by its simplicity of construction and dependability of operation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 2 is a view in perspective of the indexing mechanism embodying the invention for advancing the recording paper of the multi-point recorder shown in Figure 1.

Figure 1:
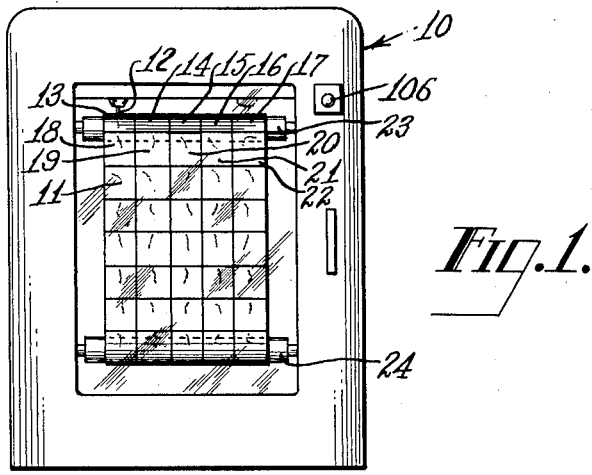
Figure 1 is a front elevational view of one form of a multi-point recorder as seen by the operator.

Referring now to the drawings wherein like reference characters are to be used to designate like components in the various figures thereof, and in particular to Figure 1, a multi-point recorder is enclosed in a housing 10 which encloses and protects the operating mechanism of the recorder. The particular embodiment of the multi-point recorder shown in Figure 1 is a 75 point recorder, that is, 75 different measuring devices may be connected with this recorder for sequentially recording 75 different graphs corresponding to the outputs of the respective measuring devices on different portions of the recording paper 11. The recording paper 11 is divided laterally into five different graph portions and longitudinally into fifteen different graph portions or into a total of seventy-five different portions.

A printer 12, which may be any suitable device such as a pen, stylus, or the like, is sequentially connected with the various measuring devices for indicating on the recording paper the readings of the respective measuring devices. So that each of the five lateral graph portions are marked before the recording paper is advanced, a printer advance mechanism (not shown) is provided for moving the printer 12 laterally to each of the five different graph portions in sequence. For example, in the first position the printer 12 is connected with a first one of the measuring devices and is caused to mark in the left hand column of the recording paper on the graph portion 13 in accordance with the reading of the first measuring device. The printer 12 is then connected with a second one of the measuring devices and the printer advancing mechanism then lifts the printer 12 from the paper 11 and advances it to the right one position until it is placed over the graph portion 14. A recording is then made on the graph portion 14 in accordance with the reading of the second measuring device. The printer advance mechanism then raises the pen from the paper and advances the printer to the graph portion 15 where it records the indication of a third measuring device and so on through graph portions 16 and 17. At the completion of the printing operation on graph portion 17, the printer mechanism raises the printer 12 from the paper and returns it to the left hand column of the paper 11. At this time the indexing motor is energized to advance the graph paper 11 so that the next row of graphs 18, 19, 20, 21 and 22 are in position for marking by the printer 12 in accordance with the readings of the sixth to tenth measuring devices.

The printer advance mechanism has not been shown in detail because it forms no part of the present invention. It is understood that alternative printing schemes could be used such as employing a single column of graph portions or employing a plurality of columns of graph portions but having a separate printer for each column.

The recording paper 11 which is in the form of an endless belt is supported by a pair of rollers 23 and 24 which are suitably journaled for rotation in the multi-point recorder housing. The recording paper advancing mechanism is connected with one of the rollers so that the recording paper is driven thereby. Preferably the surface of the drive roller, or if desired the surfaces of both of the rollers, may be covered with some material to minimize slippage of the paper and insure positive drive of the paper with the drive roller.

Referring now to Figure 2, the indexing mechanism is shown as connected by way of example with the roller 24 which drives the recording paper 11. A driving motor 30, has a worm gear 31 fastened to the motor shaft, and is positioned to drive a helical gear 32. The gear 32 is staked on to a main drive shaft 33 which is journaled for rotation in the bearings 35 and 36 which are supported by the walls 37 and 38. The roller 24, which supports the recording paper 11, is fastened to one end of the main shaft 33 through a coupling device 34 for rotation thereby. The coupling device 34 may be easily loosened to enable the roller 24 and the paper 11 to be rotated relative to the main drive shaft 33 whereby the graph paper 11 may be properly indexed with respect to the printer 12 when fresh sheets are inserted in the recorder.

A conductive disk 42 having an insulating facing 41 is fastened to the right hand end of the shaft 33 but insulated therefrom by means of an insulating bushing or the like. A contact member 40 is imbedded in the insulating facing 41 and has circuit connections to the conductive disk 42. The entire structure is fastened to the shaft 33 for rotation therewith by means of a sleeve 43. A brush 44 rides against the surface of the disk 42 to provide circuit connection means with the contact 40.

A second shaft 50 is connected to the main drive shaft 33 through a speed reducing gear train including the gears 45, 46, 47, and 48. The gear 45 is staked onto the shaft 33 and the gear 48 is staked onto the shaft 50 while the intermediate gears 46 and 47 are supported for rotation by the wall 38. The drive ratio of the shaft 33 to the shaft 50 to enable a complete rotation of the graph paper 11 is dependent upon the number of successive graph portions positioned along the length of the recording paper as will hereinafter be explained, in this case fifteen to one.

Figure 3:
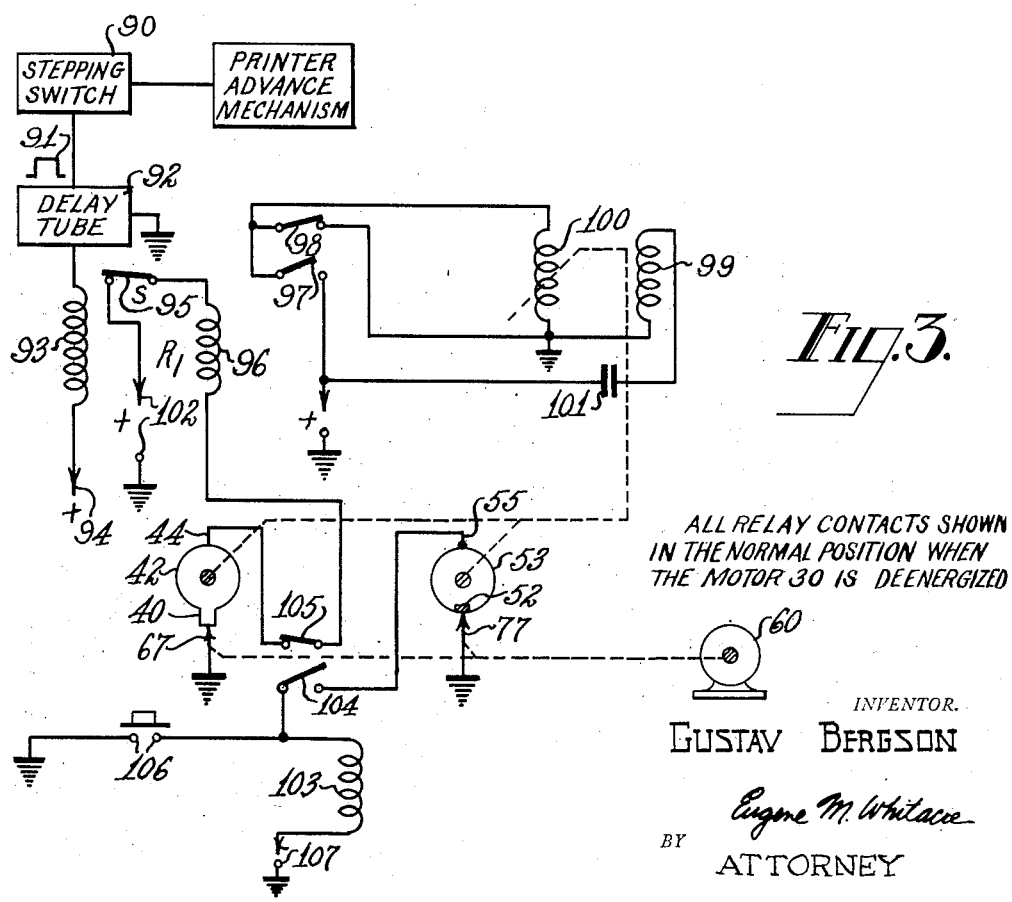
Figure 3 is a schematic circuit diagram of the control circuit for the indexing motor showing in schematic form the rotatable contact members of the indexing mechanism.

The shaft 50 is journaled for rotation in a bearing 51 which is supported in the wall 38 and has a composite disk structure comprising an insulating disk 56 sandwiched between a pair of conductive disks 53 and 57 fastened on its right hand end by a sleeve 54. An insulating contact member 52 is imbedded in the conductive disk 53 for rotation therewith. The insulating disk 56 insulates the conductive disk 53 from the chassis structure. A brush 55 rides against the disk 53 to provide circuit connection means therewith. The selection of insulating or conducting contact members and accompanying support structure is a matter of engineering design as determined by the requisites of the control circuits one example of which is shown in Figure 3.

A second driving motor 60 of the type which makes one revolution in twenty-four hours, is connected to drive a gear 59. The gear 59 drives a second gear 61 which is staked onto a drive shaft 62 which is journaled for rotation between a pair of walls 63 and 64. A conductive disk 65 is fastened on the extreme left end of the shaft 62 by means of a collar 66. The conductive disk 65 supports a contact member or brush 67 which bears against the insulating sheet 41 or the contact member 40 depending upon the relative angular positions of the shafts 33 and 62. The contact 67 which is fastened to the disk 66 by means of screw 68 is made of spring steel, or the like to provide a spring bearing against the conductive disk 42 and at the same time provide a good electrical conductor. The contact 67 is conductively connected through the conductive disk 65 and conductive shaft 62 to the chassis of the indexing mechanism or ground. A brush 69 which bears against the shaft 62 insures positive grounding of the contact member 67 at all times.

A second shaft 70 is also driven by the twenty-four hour motor through a speed reducing gear train comprising the gears 71, 72, 73 and 74. The gear 71 is staked onto the shaft 62, and the gear 74 is staked onto the shaft 70 while the intermediate gears 72 and 73 are supported for rotation by a wall 64. The shaft 70 is journaled for rotation in bearings supported by the walls 63 and 74.

On the extreme left end of the shaft 70, a metallic disk 75 is fastened by means of a collar 76 onto the shaft 70. A contact member 77 is fastened to the metallic disk by means of a screw or any other suitable means 78. The contact member 77 which is similar to the contact 67, rides the surface of the metallic disk 53 or the insulating contact member 52 depending upon the relative angular displacement of the shafts 50 and 70. The contact member 77 is conductively connected through the conductive disk 65 and the shaft 70 to the indexing mechanism chassis or ground. A grounding member 79 which bears against the shaft 70 insures positive connection between the shaft 70 and the chassis of the indexing mechanism.

Referring now to Figure 3, the control circuit diagram in which the various contact members are connected will be described and explained. A stepping switch 90 produces voltage pulses which are fed to the printer advancing mechanism to cause the printer to move laterally across the recording paper. After the printer has printed in the fifth or left hand column of the recording paper, the stepping switch 90 produces a voltage pulse 91 which is fed to the input circuit of a delay tube 92. The delay tube 92, which is normally non-conducting, is connected to a source of polarizing potential 94 through a relay winding 93 which controls the normally closed contacts 95. The voltage pulse 91 causes the delay tube to conduct, hence energizing the relay windings 93 which causes the contacts 95 to open.

The relay contacts 95 control the energizing circuit of a motor control relay 96 which in turn controls the energization circuit of the indexing motor 30. When the motor control relay 96 is energized, the indexing motor is immediately stopped. When the motor control relay 96 is deenergized, the indexing motor is energized to drive the contact members 40 and 52 and the recording paper 11.

The indexing motor 30 has a pair of field windings 99 and 100 which control the operation thereof. The winding 99 is serially connected with a capacitor 101 between a source of energizing potential 102 and ground and effectively across the terminals of the source of energizing potential 102. The field winding 100 when shorted and disconnected from the source of energizing potential causes the motor to stop quickly.

Normally a pair of relay contacts 97 and 98 which are controlled by the motor control relay winding 96, short the motor winding 100 and maintain an open circuit between the motor winding 100 and the source of energizing potential 102. When the normally energized motor control relay winding 96 is deenergized, for example, by energization of the relay winding 93 and the opening of contacts 95, the contacts 98 open to remove the short circuit across the motor winding 100 and the relay contacts 97 close to connect the top side of the motor winding 100 to the source of energizing potential 102, thus energizing the motor.

The delay tube 92 is designed to conduct for a short period of time so that the motor will be energized long enough to turn the contact member 40 out of engagement with the contact member 67. Since the control circuit for the relay winding 96 passes through the brush 44, the conductive disk 42, the contacts 40 and 67, the control circuit will remain open and the motor remains energized to drive the contact 40 until it again engages the contact 67. When the contacts 40 and 67 meet, the relay 96 is again energized and the motor is immediately stopped since the motor winding 100 is shorted and disconnected from the source of energizing potential 102.

The contact 67 is continuously moved by the twenty-four hour motor 60 so that each time the contact 40 is rotated, the contact 67 has moved slightly, requiring a slightly greater rotation of the main drive shaft 33. Thus, the time axis of the recording paper which is driven by the main drive shaft 33 is kept in synchronism with the printer 12 so that the resulting recording of a particular measurement is properly indexed with respect to the time axis of the respective graph portions. In other words, each time the printer 12 records the output of one of the measuring devices on an appropriate graph portion, the mark will be placed a slight distance farther along the graph portion until at the end of a twenty-four hour period, successive recordings are displayed as substantially a continuous line graph of the intermittent measurements of the respective measuring devices.

If it should be desired during the course of operation of the multi-point recorder to view the various recording points or home the recording paper to the first graph portion printed, a switch 106 may be depressed to energize a homing control circuit. The switch 106 energizes a relay winding 103 that controls a pair of contacts 104 and 105, which are normally open and closed respectively when the relay winding 103 is not energized. The contacts 105 are connected in circuit with the motor control relay 96 and the contact members 40 and 67. Upon energization of the relay winding 103, the contacts 105 open to deenergize the relay winding 96 thus energizing the motor 30. Since the contacts 105 are in series with the rotatable contact members 40 and 67, the latter contact members have no effect on the operation of the relay 96 and hence, the indexing motor during the homing operation.

The normally open holding contacts 104 are connected from the source of energizing potential 107 through the brush 55, the conductive disk 53 and the contact 77 to ground. The relay winding 103 will remain energized through this holding circuit even though the switch 106 is opened until the insulating contact portion 52, which is being rotated by the indexing motor 30, meets the contact 77 at which time the holding contact circuit is broken and the relay 103 is then deenergized. The contacts 105 then close to connect the contacts 40 and 67 to control the operation of the relay 96 and hence the indexing motor 30. At the time the relay 103 is deenergized, the contacts 40 and 67 are making contact for the fifteenth time. Since the relay 96 energizing circuit is completed through the contacts 40 and 67, the motor is immediately stopped. The graph paper 11, which has been rotated through at least part of a cycle, is ready for printing in the home graph portion at precisely the exact point along the time axis.

It is obvious that an indexing system in accordance with the invention could be used with other types of recording systems such as those employing recording paper in the form of a circular disk for example.

There has been described in accordance with the invention, an improved indexing mechanism for the recording medium of a multi-point recorder which provides accurate and positive indexing of the recording medium, and which provides a mechanism for selectively moving the recording medium any predetermined amount, and to thereafter accurately index the recording medium with respect to the printer.

What is claimed is:

1. An indexing and homing mechanism comprising in combination, a first driving means, means for intermittently energizing said first driving means, a first and a second contact members moved by said first driving means, speed changing means interposed between said first and second contacts, a second driving means, third and fourth contact members for cooperation respectively with said first and said second contact members moved by said second driving means, a second speed changing means connected between said third and fourth contacts, electric circuit means connected with said first and third contacts for stopping said first driving means upon engagement of said first and third contacts, and further electric circuit means connected with said second and fourth contacts for selectively rendering said first and third contact members temporarily inoperative to stop said first driving means upon disengagement of said second and fourth contact members.

2. An indexing and homing mechanism comprising in combination, a first driving means, means for intermittently energizing said first driving means, a first and a second contact members moved by said first driving means, speed changing means interposed between said first and second contact members, a second driving means, a third contact member moved by said second driving means for intermittent cooperative engagement with said first contact member, a fourth contact member positioned for intermittent engagement with said second contact member, electric circuit means connected with said first and third contacts for deenergizing said first driving means upon engagement of said first and third contacts, and electric circuit means connected with said second and fourth contacts for selectively rendering said first and third contact members temporarily inoperative to deenergize said first driving means upon disengagement of said second and fourth contact members.

3. An indexing and homing mechanism for the recording paper of a multi-point recorder comprising in combination, a first driving means, means for intermittently energizing said driving means to advance said recording paper, a first and a second contact members connected for rotation by said first driving means, a speed reducing gear train interposed between said first and second contact members, a second continuously operable driving means, third and fourth contact members connected for rotation by said second driving means, said second driving means operable to rotate said third contact member once in twenty-four hours, a second speed reducing gear train interposed between said third and fourth contact members, said third and fourth contact members positioned for cooperation respectively with said first and second contact members, electric circuit means connected with said first and third contact members for deenergizing said first driving means and stopping the movement of said recording paper upon engagement of said first and third contact members, and further electric circuit means for selectively energizing said first driving means and connecting said second and fourth contact members in circuit for stopping said first driving means and said recording paper upon engagement of said second and fourth contact members.

4. An indexing mechanism comprising in combination, a first intermittently operable driving means, a first contact member moved by said first driving means, a second contact member, a second continuously rotatable driving means for moving said second contact member, means positioning said contact members for intermittent cooperative engagement, and electric circuit means connected with said contact members for stopping said first driving means when said first and second contact members are in engagement.

5. An indexing mechanism for intermittently moving the recording medium of a multi-point recorder comprising in combination, a first driving means, means for intermittently energizing said first driving means, a first contact member, said driving means connected for simultaneously moving said first contact member and said recording medium, a second continuously rotatable driving means, a second contact member moved by said second driving means positioned for intermittent cooperative engagement with said first contact member, and electric circuit means connected with said contact members for stopping said first driving means when said first and second contacts are in engagement.

6. An indexing mechanism comprising in combination, a first driving means, means for intermittently energizing said first driving means, a first contact member moved by said first driving means, a second continuously rotatable driving means, a second contact member moved by said second driving means and positioned for intermittent cooperative engagement with said first driving contact member, and electric circuit means connected with said contact member for stopping said first driving means when said first and second contact members are in engagement.

7. The combination with a multi-point recording system of the type for recording the outputs of a plurality of different measuring devices and including a printing mechanism responsive to the output of said measuring devices, a recording medium movable relative to said printing mechanism, means for connecting said printing mechanism successively with the different measuring devices and causing the outputs thereof to be recorded on said medium, and said recording medium having successive longitudinal portions for receiving the recording of different ones of the outputs from said measuring devices, of an indexing mechanism for intermittently advancing said medium to move different ones of said longitudinal portions into position for recording by said printing mechanism when different ones of said measuring devices are connected with said printing device comprising an indexing motor, means for intermittently energizing said motor to advance said recording medium, a first and second contact members connected for rotation by said indexing motor, speed reducing means interposed between said first and second contact members, a second continuously operable driving motor, third and fourth contact members connected for rotation by said second motor, second speed reducing means interposed between said third and fourth contact members, said second motor operable to rotate said third contact member once in a predetermined period of time, said third and fourth contact members positioned for cooperation respectively with said first and second contact members, electric circuit means connected with said first and third contact members for deenergizing said indexing motor and stopping movement of said recording medium upon engagement of said first and third contact members, and further electric circuit means for selectively energizing said indexing motor and connecting said second and fourth contact members in circuit for stopping said indexing motor and said recording medium upon engagement of said second and fourth contact members.

8. The combination with a multi-point recording system of the type for recording the outputs of a plurality of different measuring devices and including a printing mechanism responsive to the outputs of said measuring devices, a recording medium movable relative to said printing mechanism, means for connecting said printing mechanism successively with the different measuring devices and causing the outputs thereof to be recorded on said medium, and said recording medium having successive longitudinal portions for receiving the recording of different ones of the outputs from said measuring devices, of an indexing mechanism for intermittently advancing said medium to move different ones of said longitudinal portions into position for recording by said printing mechanism when different ones of said measuring devices are connected with said printing device comprising an indexing motor, means for intermittently energizing said motor to advance said recording medium, a first contact member connected for rotation by said indexing motor, a second continuously operable driving motor, a second contact member connected for rotation by said second motor, said second motor operable to rotate said second contact member once in a predetermined period of time, said first and second contact members positioned in intermittent cooperative engagement, and electric circuit means connected with said contact members for deenergizing said indexing motor when said first and second contacts are in engagement.

References Cited in the file of this patent
UNITED STATES PATENTS

| | | |
|---|---|---|
| 1,092,323 | Zander | Apr. 7, 1914 |
| 1,696,617 | Welch | Dec. 25, 1928 |
| 2,118,081 | Grisdale | May 24, 1938 |